United States Patent
Hellwig et al.

(10) Patent No.: US 11,036,872 B2
(45) Date of Patent: Jun. 15, 2021

(54) PRIVACY-PRESERVING SUM-BASED CONSISTENCY CHECKS FOR BLOCKCHAINS

(71) Applicant: SAP SE, Walldorf (DE)

(72) Inventors: Christian Hellwig, Rott (DE); Kilian Becher, Dresden (DE); Axel Schroepfer, Borthen (DE)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 16/522,258

(22) Filed: Jul. 25, 2019

(65) Prior Publication Data
US 2021/0026971 A1    Jan. 28, 2021

(51) Int. Cl.
| H04L 29/06 | (2006.01) |
| G06F 21/60 | (2013.01) |
| H04L 9/00 | (2006.01) |
| G06Q 20/36 | (2012.01) |
| H04L 9/32 | (2006.01) |

(52) U.S. Cl.
CPC ....... *G06F 21/602* (2013.01); *G06Q 20/3678* (2013.01); *H04L 9/008* (2013.01); *H04L 2209/38* (2013.01); *H04L 2209/56* (2013.01)

(58) Field of Classification Search
CPC ... G06F 21/602; G06Q 20/3678; H04L 9/008; H04L 2209/38; H04L 2209/56
See application file for complete search history.

(56) References Cited

U.S. PATENT DOCUMENTS

| 10,365,922 | B1* | 7/2019 | Wang | H04L 63/123 |
| 10,521,196 | B1* | 12/2019 | Wang | G06F 8/34 |
| 10,884,810 | B1* | 1/2021 | Verma | H04L 67/104 |
| 2016/0330034 | A1* | 11/2016 | Back | H04L 9/3255 |
| 2017/0243193 | A1* | 8/2017 | Manian | G06Q 20/065 |
| 2018/0109541 | A1* | 4/2018 | Gleichauf | H04W 12/10 |

(Continued)

OTHER PUBLICATIONS

Jawurek et al., "Privacy in Smart Grids," Friedrich-Alexander-Universitat Erlangen-Nurnberg, Technischen Fakultat, PhD thesis:1-256 (2013).

(Continued)

*Primary Examiner* — Gary S Gracia
(74) *Attorney, Agent, or Firm* — Erise IP, P.A.

(57) ABSTRACT

A blockchain service receives a first request to insert a first value associated with a transaction into a blockchain. In response, the blockchain service calls a commitment service to obtain a commitment based on the first value. The blockchain service then inserts the commitment into the blockchain at a block associated with the transaction. When the blockchain service subsequently receives a second request to confirm whether a second value matches the first value, it can obtain the commitment from the blockchain. This obtained commitment is then passed to the commitment service along with the second value. The blockchain service then receives a confirmation from the commitment service whether the first value matches the second value. The blockchain service can provide a reply to the second request encapsulating the confirmation. Other variations are provided in which residual amount values can be confirmed. Related apparatus, systems, techniques and articles are also described.

20 Claims, 4 Drawing Sheets

(56) References Cited

U.S. PATENT DOCUMENTS

| | | | | |
|---|---|---|---|---|
| 2018/0253702 A1* | 9/2018 | Dowding | ............... | G06Q 20/06 |
| 2018/0331832 A1* | 11/2018 | Pulsifer | ................. | H04L 9/0637 |
| 2018/0349896 A1* | 12/2018 | Arora | .................... | H04L 9/3247 |
| 2019/0012662 A1* | 1/2019 | Krellenstein | .......... | G06Q 40/04 |
| 2019/0026821 A1* | 1/2019 | Bathen | ................... | G06Q 40/00 |
| 2019/0123889 A1* | 4/2019 | Schmidt-Karaca | .......................... H04L 9/3239 | |
| 2019/0182254 A1* | 6/2019 | Christidis | ............. | H04L 9/0637 |
| 2019/0238525 A1* | 8/2019 | Padmanabhan | ..... | G06F 21/6245 |
| 2020/0012527 A1* | 1/2020 | Hartsock | ............... | H04L 9/0894 |

OTHER PUBLICATIONS

Pedersen, "Non-Interactive and Information-Theoretic Secure Verifiable Secret Sharing," Advances in Cryptology, Crypto '91, Feigenbaum (ed), Springer-Verlag Berlin Heidelberg, pp. 129-140 (1992).

* cited by examiner

PRIVACY-PRESERVING SUM-BASED CONSISTENCY CHECKS FOR BLOCKCHAINS

TECHNICAL FIELD

The subject matter described herein relates to confirming values within a blockchain while preserving the privacy of sensitive data.

BACKGROUND

Blockchains are increasingly being utilized to memorialize transaction information among different parties whether it be relating to cryptocurrency, transfer of goods, or other types of commercial transactions. Such transaction information can include potentially sensitive information including, for example, party information, amounts associated with such transactions, as well as dates of such transactions. While the use of blockchains provides many advantages, the potential leakage of sensitive transaction information has hampered blockchain adoption in certain industries.

SUMMARY

In a first aspect, a blockchain service receives a first request to insert a first value associated with a transaction into a blockchain. In response, the blockchain service calls a commitment service to obtain a commitment based on the first value. The blockchain service then inserts the commitment into the blockchain at a block associated with the transaction. When the blockchain service subsequently receives a second request to confirm whether a second value matches the first value, it can obtain the commitment from the blockchain. This obtained commitment is then passed to the commitment service along with the second value. The blockchain service then receives a confirmation from the commitment service whether the first value matches the second value. The blockchain service can provide a reply to the second request encapsulating the confirmation.

The commitment service can generate the commitment by cryptographically encoding the first value. The commitment service can open the commitment passed from the blockchain service to confirm whether the commitment of the first value can be opened with the second value.

The commitment service can use a homomorphic commitment scheme.

In cases in which the received confirmation indicates that the second value does not match the first value, data indicative of fraud can be transmitted (e.g., an alert can be generated, etc.).

The transaction can be associated with a variety of types of transactions. As one non limiting example, the transaction is associated with the sale of goods within a supply chain and the first value is associated with an amount of available goods.

In some variations, the blockchain service is executed by a first server and the commitment service is executed by a second server that is separate and distinct from the first server. In other variations, the commitment service is a library of the blockchain service.

In an interrelated aspect, a blockchain service receives a plurality of requests to each insert a value associated with a respective transaction into a blockchain. For each request, the blockchain service calls a commitment service to obtain a commitment based on the corresponding value. The blockchain service later inserts each of the commitments into the blockchain at one or more blocks associated with the transaction. The blockchain service can subsequently receive a second request to confirm a residual amount value associated with the transactions. In response, the blockchain service obtains each of the inserted commitments from the blockchain. The blockchain service then calls the commitment service to obtain a commitment of a sum of committed values computed by multiplying the commitments. The blockchain service then obtains, from the blockchain, a residual amount. Next, the blockchain service calls the commitment service to verify that the sum of committed values plus the residual amount is equal to a publicly known value based on the commitment of the sum, a commitment of a known maximum amount, and the residual amount. The blockchain service can then provide a reply to the second request indicating whether the blockchain indicates that there are values equal to the residual amount value.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. In particular, the commitment schemes as used herein confirm values on blockchains while, at the same time, not leaking sensitive information relating to corresponding transactions.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
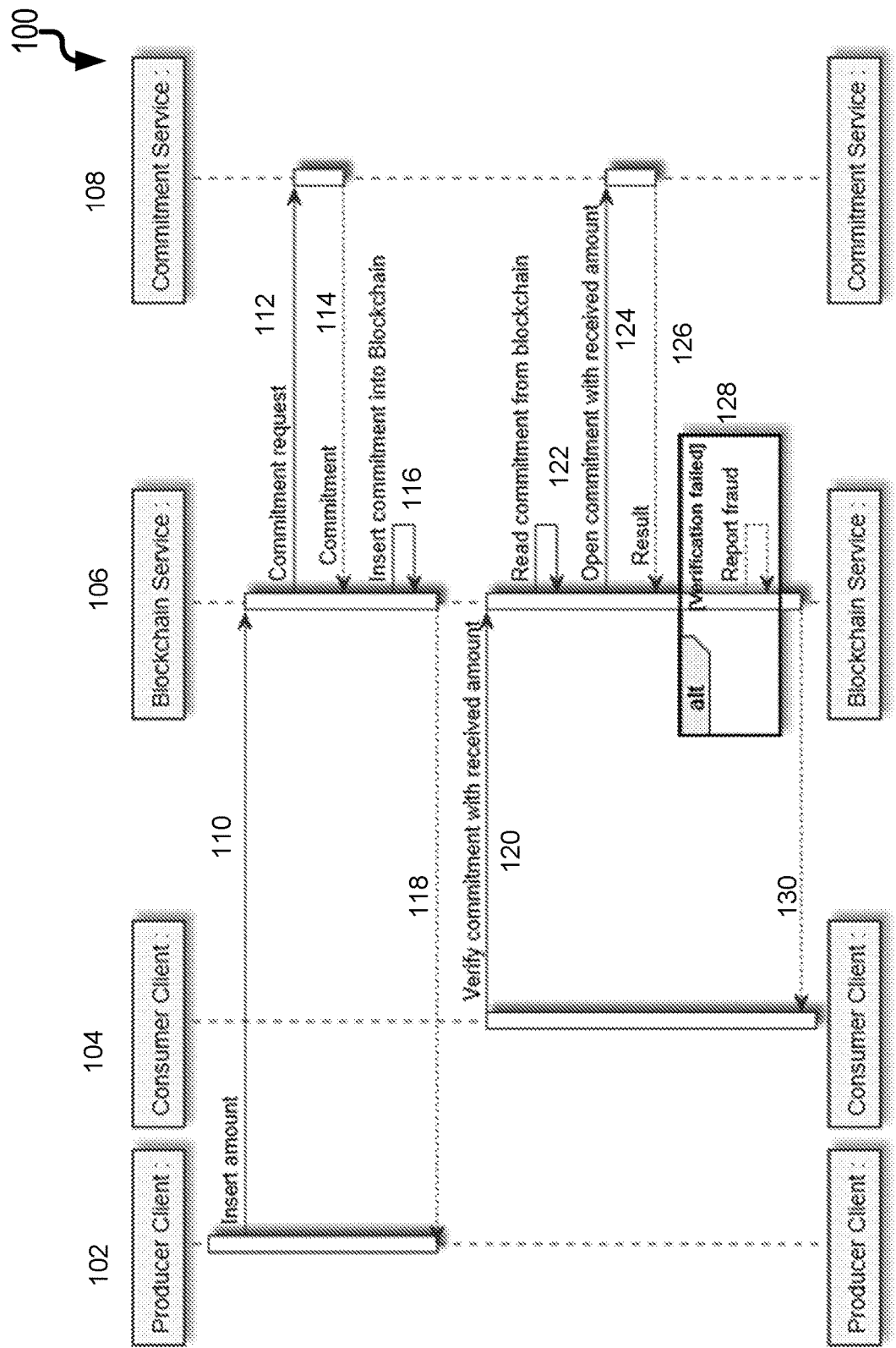
FIG. 1 is a sequence diagram illustrating a verification of an amount on a blockchain.

The current subject matter is directed to techniques for verifying values present within a blockchain while, at the same time, preserving the privacy of various information contained within such value. For example, a number of available widgets can be confirmed while, at the same time, not revealing how many widgets were originally available and/or where previously transferred/sold widgets were transported and the like.

The blockchain consistency check protocol described in this document utilizes a homomorphic commitment scheme. A homomorphic commitment scheme, as provided herein, allows a committing party B to commit to a value x by publishing a commitment c but without having to reveal x. Later, when B publishes x, a verifying party A can verify whether the revealed value x in fact equals the value that B previously committed to. As used herein, the symbol "$\equiv_p$" denotes congruence mod p.

As part of a setup process, initially, any trusted authority that does not collude with the committing party chooses prime numbers p and q at random s.t. q|p−1. Thereafter, the verifying party A chooses a subgroup $\langle g \rangle = \langle h \rangle = \mathbb{Z}_q \subset \mathbb{Z}^*_p$ of order q s.t. g and h are generators of $\mathbb{Z}_q$. Lastly, p, q, g, and h are published by the verifying party A.

As part of a commitment process, the committing party B chooses $r \in \mathbb{Z}_q$. Next, the committing party B computes a commitment $c = \text{Commit}(x, r) = g^x h^r \mod p$ for a secret message $x \in \mathbb{Z}_q$. Once c is computed, this value can be published by the committing party B.

As part of a verification process, the committing party B publishes x and r. In addition, the verifying party A computes $$\text{Open}(c, x, r) = \begin{cases} \top & \text{if } c = \text{Commit}(x, r) = g^x h^r \mod p \\ \bot & \text{otherwise} \end{cases}$$

The homomorphic properties can include as follow:
Addition of committed values $x_1$ and $x_2$:

$\text{Commit}(x_1, r_1) \cdot \text{Commit}(x_2, r_2) \equiv_p \text{Commit}(x_1 + x_2 \mod q, r_1 + r_2 \mod q)$ Multiplication of committed value x with plain value v:

$\text{Commit}(x, r)^v \equiv_p \text{Commit}(v \cdot x \mod q, v \cdot r \mod q)$ Blockchain consistency checks based on commitments. The following protocol describes how a producer P can commit to produced amounts $x_i$ of a particular good that he sends to consumers $C_j$. The total amount $x_{max} = \Sigma_i x_i$ of the good that P can produce is limited. This limit may be publicly known.

Setup. Every consumer $C_j$ has an individual key pair ($pk_j$, $sk_j$) of an asymmetric cryptosystem, consisting of a public encryption key $pk_j$ and a secret decryption key $sk_j$. Applying the encryption function $E_{pkj}(\cdot)$ to a plaintext x yields the corresponding ciphertext y, i.e., $E_{pkj}(x) = y$. Accordingly, applying the decryption function $D_{skj}(\cdot)$ to a ciphertext y yields the corresponding plaintext x, i.e, $D_{skj}(y) = x$.

The maximum amount $x_{max}$ of a good that a producer P is entitled to produce is publicly available.

Amount commitment. Producer P chooses $r_i \in \mathbb{Z}_q$. P commits to the produced amount $x_i$ that he sends to consumer $C_j$, i.e., $c_i = \text{Commit}(x_i, r_i)$. P publishes $c_i$ by storing it on the blockchain. P encrypts $r_i$ with consumer $C_j$'s public key, i.e., $s_i = E_{pkj}(r_i)$. P sends $s_i$ to $C_j$, e.g., by publishing it on the blockchain.

Single amount verification. Consumer $C_j$ decrypts $s_i$, i.e., $r_i = D_{skj}(s_i)$. $C_j$ verifies $c_i$ by opening $c_i$ with the (physically) received amount $x_i$ and decrypted $r_i$, i.e., $c_i \stackrel{?}{=} \text{Commit}(x_i, r_i)$. For example, the consumer can report fraud if $c_i \neq \text{Commit}(x_i, r_i)$.

Residual amount verification. Producer P regularly publishes the residual amount $\delta_i = x_{max} - \Sigma_i x_i$, e.g., for each i where 100|i, on the blockchain. P publishes the sum of all previously used random values, i.e., $\Sigma_i r_i$. Verifier V computes the commitment for the residual amount $\delta_i = x_{max} - \Sigma_i x_i$ based on the previous commitments:

$c\delta_i = cx_{max} \cdot (\Pi_i c_i)^{-1}$

V verifies the published residual amount:

$$\text{Open}\left(c_{\delta i}, \delta_i, r_{max} - \sum_i r_i\right) \stackrel{?}{=} \begin{cases} \top & \text{If published residual amount is valid} \\ \bot & \text{If published residual amount is invalid} \end{cases}$$

a) V reports fraud if $\text{Open}(c_{\delta i}, \delta_i, r_{max} - \Sigma_i r_i) = \bot$ FIG. 1 is a sequence diagram illustrating interaction among various computing resources referred to herein as a producer client 102, a consumer client 104, a blockchain service 106, and a commitment service 108. Each of the producer client 102, the consumer client 104, the blockchain service 106, and the commitment service 108 each represent at least one computing device (e.g., a mobile phone, a personal computer, a cluster of computers, or a cloud-based service, etc.) with the producer client 102 referring to a computing device associated with a manufacturer of a product or an entity providing a service, the consumer client 104 referring to a computing device associated with a purchaser of such product or a consumer of such service, the blockchain service 106 referring to a series of computing devices providing a distributed electronic ledger sometimes referred to as a blockchain, and a commitment service 108 providing functionality as further described below (e.g., a homomorphic commitment scheme). In some arrangements, the blockchain service 106 and the commitment service 108 are executed by the same or overlapping computing devices. For purposes of this description, references made to actions taken by the producer client 102 and the consumer client 104 refer to computer-implemented signals and the like that are sent, received, or otherwise exchanged and are associated with the corresponding manufacturer/service provider/purchaser/service consumer, etc. Such computer-implemented signals can, for example, be part of a specialized software application or the like that interfaces with the blockchain service 106.

Referring again to the sequence diagram 100 of FIG. 1, such diagram 100 relates to a verification of a single amount on a blockchain. With such an arrangement, the producer client 102 can, at 110, initially transmit data to insert an amount 110 into a blockchain (by way of the blockchain service 106). The blockchain service 106 rather than inserting the amount into the blockchain, sends, at 112, such amount to the commitment service 108. The commitment service 108 then calculates a commitment for such amount and, at 114, sends such commitment to the blockchain service 106 so that the blockchain service, at 116, can insert such commitment into the blockchain (as opposed to the amount received from the producer client 102). The blockchain service 106, in some variations, can, at 118, provide a confirmation or other indication to the producer client 102 that indicates that the amount has been inserted into the blockchain (i.e., a commitment corresponding to the amount has been inserted into the blockchain).

Subsequently, the consumer client 104, at 120, sends a request to the blockchain service 106 to confirm the amount on the blockchain (such request encapsulates an amount). Thereafter, the blockchain service 106, at 122, reads the commitment on the blockchain. The blockchain service 106 then, at 124, sends a request to the commitment service 108 encapsulating the commitment and the amount received from the consumer client 104. The commitment service 108 at such time then verifies whether the commitment corresponds to the value, i.e., whether the computed commitment can be opened with the given value. At 126, the result of such comparison (i.e., confirmed/not confirmed, etc.) is sent to the blockchain service 106. In some variations, if the result indicates that the amount has not been confirmed, at 128, the blockchain service 106 can report fraud (whether by adding an entry into the blockchain or otherwise). Lastly, the blockchain service 106 next, at 130, sends a reply to the consumer client 104 indicating whether or not the amount was confirmed.

Figure 2:
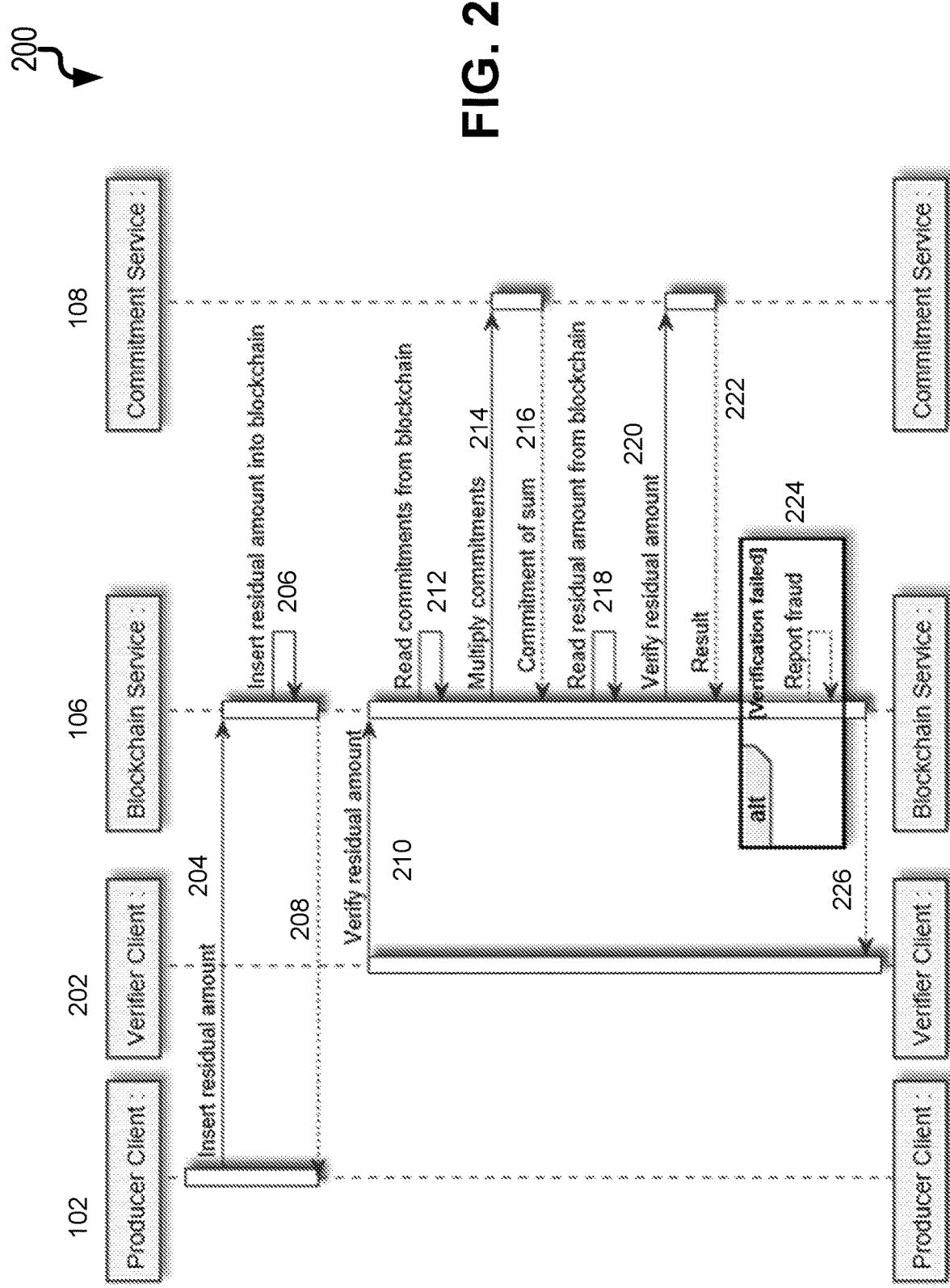
FIG. 2 is a sequence diagram illustrating a verification of residual amounts on a blockchain.

FIG. 2 is a sequence diagram 200 illustrating an arrangement in which a residual amount (e.g., a total number of available units after earlier transactions, etc.) is verified. This diagram 200 includes a producer client 102, a blockchain service 106 and a commitment service 108 as in FIG. 1 and additionally includes a verifier client 202. The verifier client 202 can be at least one computing device that queries the blockchain service 106 to verify an amount of available units/offerings. In some cases, the verifier client 202 can be the consumer client 104 while in other scenarios, the verifier client 202 is a different computing device simply seeking to verify values on the blockchain. At some juncture, the producer client 102, at 204, sends a request to the blockchain service 106 to insert a residual amount into the blockchain. The blockchain service 106, at 206, causes the residual amount to be inserted into the appropriate location within the blockchain. The blockchain service 106 then, at 208, sends a confirmation to the producer client 102 that the residual amount was inserted into the blockchain. Later, the verifier client 204, at 210, sends a request to the blockchain service 106 to verify the residual amount. The blockchain service 106, in response, at 212, reads all commitments from the blockchain from transactions relating to the units in question. The blockchain service 106 then, at 214, sends a request to the commitment service 108 to multiply the read commitments. This request contains read commitments. The commitment service 108 then, at 216, generates a commitment by the received value (the multiplication of the read commitments, which equals the commitment of the sum of the underlying committed amounts) and sends the corresponding commitment to the blockchain service 106. The blockchain service 106 then, at 218, reads to residual amount from the blockchain and, at 220, calls the commitment service 108 to verify the residual amount. This request contains the commitment of the sum, the residual amount and the (pre-computed) commitment of the maximum amount. For verification, the commitment service 108 multiplicatively inverts the commitment of the sum by raising it to the power of −1. It then multiplies the commitment of the maximum amount by the multiplicatively inverted commitment of the sum. This computation yields the commitment of the residual amount.

The commitment service 108 at such time then verifies whether the commitment corresponds to the received residual amount, i.e., whether the computed commitment of the residual amount can be opened with the received residual amount. At 222, the result of such comparison (i.e., confirmed/not confirmed, etc.) is sent to the blockchain service 106. In some variations, if the result indicates that the residual amount has not been confirmed, at 224, the blockchain service 106 can report fraud (whether by adding an entry into the blockchain or otherwise). Lastly, the blockchain service 106 next, at 226, sends a reply to the verifier client 202 indicating whether or not the residual amount was confirmed.

Figure 3:
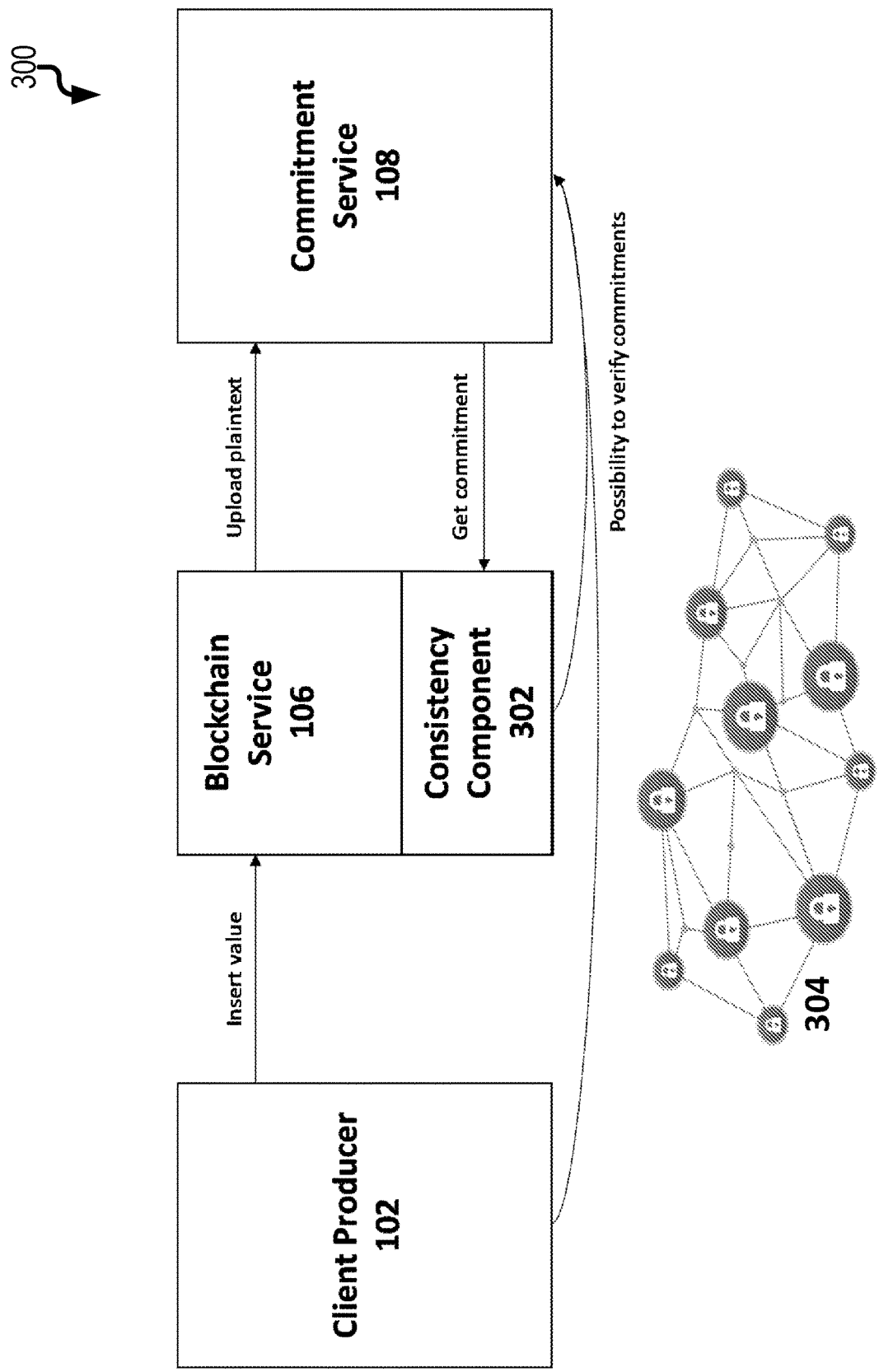
FIG. 3 is a diagram illustrating a computing architecture for implementing aspects of the current subject matter.

FIG. 3 is an example architecture diagram 300 including the producer client 102, the blockchain service 106, and the commitment service 108. The producer client 102 has the capability to call a blockchain consistency component 302 of the blockchain service 106 to trigger arbitrary consistency checks. Consistency checks, in this regard, refer to the verification of values within one or more blockchains 304 associated with the blockchain service. The producer client 102 can access the blockchain service 106 via different mechanisms including via URLs encapsulating authentication information and the like. As noted above, the blockchain consistency component 302 of the blockchain service 106 can comprise two representational state transfer (Rest) services.

The producer client 102 can, as mentioned above, insert data into the blockchain 304 by way of the blockchain service 106. The blockchain service 106 will call the commitment service 108 to create new commitments which are then added to the blockchain 304. Each service can be structured in a client-service manner to allow both service-side and client-side data verification.

The blockchain service 106 can offer a Rest API to insert data into the blockchain 302. The producer client 102 can send numeric values through the blockchain service 106, where they may be forwarded to the commitment service 108, to create a new commitment. The commitment may be inserted into the blockchain 302 by the blockchain service 106. Furthermore, the blockchain consistency component 304 can comprise verification logic that can be used to verify whether the sum of the numeric values exceeds a given threshold (and/or that a value matches a requested amount, etc.).

The commitment service 108, as an example, can be written in Kotlin and divided into two modules. The first module can use Spring Boot to offer Rest functionality and perform input validation before the data will be passed to the second module. The second module can be a commitment scheme module where the commitments are calculated, summed, and verified.

In some variations, the commitment service 108 can be a code library forming part of the blockchain service 106. In addition, there can be variations in which there are numerous commitment service 108 executing the same commitment schemes and/or the commitment service 108 can execute multiple commitment schemes. The use of multiple commitment services, for example, can be used to provide a distributed and/or redundant solution.

Figure 4:
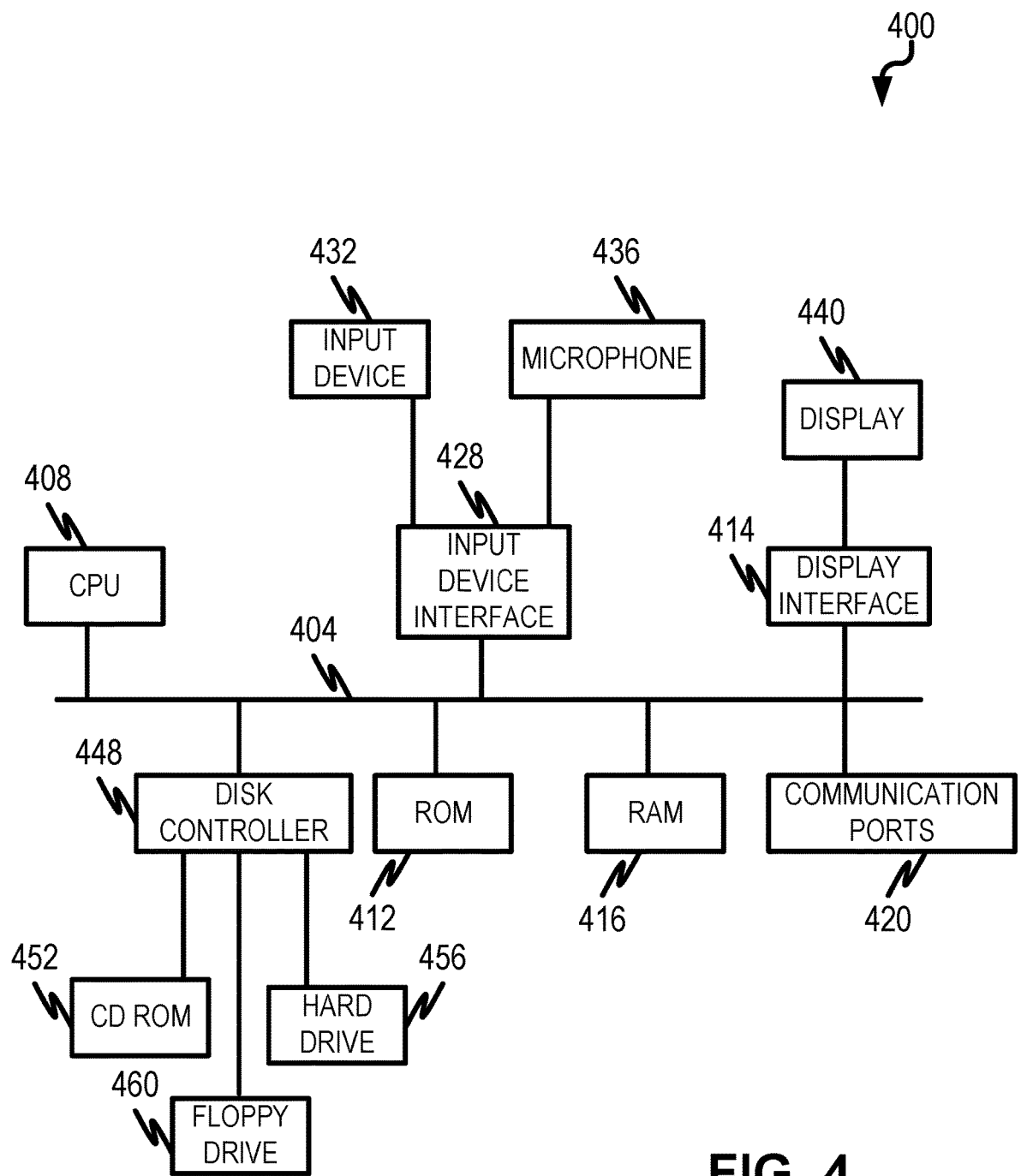
FIG. 4 is a diagram of a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
receiving, by a blockchain service, a first request to insert a first value associated with a transaction into a blockchain;
calling, by the blockchain service, from a first computing device, a commitment service to obtain a commitment based on the first value;
inserting, by the blockchain service, the commitment into the blockchain at a block associated with the transaction;
subsequently receiving, by the blockchain service, from a second computing device, a second request to confirm whether a second value matches the first value;
obtaining, by the blockchain service, the commitment from the blockchain;
passing, by the blockchain service to the commitment service, the commitment and the second value;
receiving, by the blockchain service from the commitment service, a confirmation of whether the first value matches the second value, wherein when the first value and second do not match, the blockchain service generates a fraud alert; and
providing, by the blockchain service, a reply to the second request encapsulating the confirmation, wherein the blockchain service and the commitment service each represent at least one computing device communicating over a communication network with the first and second computing device.

2. The method of claim 1 further comprising:
generating, by the commitment service, the commitment by cryptographically encoding the first value.

3. The method of claim 2 further comprising:
opening, by the commitment service, the commitment passed from the blockchain service; and
confirming whether the commitment of the first value can be opened with the second value.

4. The method of claim 1 wherein the commitment service uses a homomorphic commitment scheme.

5. The method of claim 1 further comprising:
transmitting data indicative of fraud if the received confirmation indicates that the second value does not match the first value.

6. The method of claim 1, wherein the transaction is associated with the sales of goods within a supply chain and the first value is associated with an amount of available goods.

7. The method of claim 1, wherein the blockchain service is executed by a first server and the commitment service is executed by a second server that is separate and distinct from the first server.

8. The method of claim 1, wherein the commitment service is a library of the blockchain service.

9. The method of claim 8 further comprising:
generating, by the commitment service, each of the commitments by cryptographically encoding values corresponding to each of the commitments.

10. A computer implemented method comprising:
receiving, by a blockchain service, from a first computing device, a plurality of requests to each insert a corresponding value associated with a respective transaction into a blockchain;
calling, by the blockchain service for each request, a commitment service to obtain a commitment based on the corresponding value;
inserting, by the blockchain service, each of the commitments into the blockchain at one or more blocks associated with the transaction;
subsequently receiving, by the blockchain service, from a second computing device, a second request to confirm a residual amount value associated with the transactions;
obtaining, by the blockchain service, each of the inserted commitments from the blockchain;
calling, by the blockchain service, the commitment service to obtain a commitment of a sum of committed values computed by multiplying the commitments;
obtaining, by the blockchain service, a residual amount from the blockchain;
calling, by the blockchain service, the commitment service to verify that the sum is equal to the residual amount value based on the commitment of the sum, a commitment of a known maximum amount, and the residual amount, wherein when the first value and second do not match, the blockchain service generates a fraud alert; and
providing, by the blockchain service, a reply to the second request indicating whether the blockchain indicates that there are values equal to the residual amount value, wherein the blockchain service and the commitment service each represent at least one computing device communicating over a communication network with the first and second computing device.

11. The method of claim 10, wherein the commitment service uses a homomorphic commitment scheme.

12. The method of claim 10 further comprising:
transmitting data indicative of fraud if the received confirmation indicates that the blockchain indicates that there are not values equal to the residual amount value.

13. The method of claim 10, wherein the transaction is associated with the sales of goods within a supply chain and the first value is associated with an amount of available goods.

14. The method of claim 10, wherein the blockchain service is executed by a first server and the commitment service is executed by a second server that is separate and distinct from the first server.

15. The method of claim 10, wherein the commitment service is a library of the blockchain service.

16. A system comprising:
at least one data processor; and
memory storing instructions which, when executed by the at least one data processor,
result in operations comprising:
receiving, by a blockchain service, from a first computing device, a first request to insert a first value associated with a transaction into a blockchain;
calling, by the blockchain service, a commitment service to obtain a commitment based on the first value;
inserting, by the blockchain service, the commitment into the blockchain at a block associated with the transaction;
subsequently receiving, by the blockchain service, from a second computing device, a second request to confirm whether a second value matches the first value;
obtaining, by the blockchain service, the commitment of the first value from the blockchain;
passing, by the blockchain service to the commitment service, the commitment and the second value;
receiving, by the blockchain service from the commitment service, a confirmation of whether the first value matches the second value, wherein when the first value and second do not match, the blockchain service generates a fraud alert; and providing, by the blockchain service, a reply to the second request encapsulating the confirmation, wherein the blockchain service and the commitment service each represent at least one computing device communicating over a communication network with the first and second computing device.

17. The system of claim 16, wherein the operations further comprise:

generating, by the commitment service, the commitment by cryptographically encoding the first value;

opening, by the commitment service, the commitment passed from the blockchain service; and confirming whether the commitment of the first value can be opened with the second value.

18. The system of claim 17, wherein the commitment service uses a homomorphic commitment scheme.

19. The system of claim 18, wherein the operations further comprise:

transmitting data indicative of fraud if the received confirmation indicates that the second value does not match the first value.

20. The system of claim 19, wherein the transaction is associated with the sales of goods within a supply chain and the first value is associated with an amount of available goods.

* * * * *